US011655405B2

United States Patent
Lu et al.

(10) Patent No.: US 11,655,405 B2
(45) Date of Patent: May 23, 2023

(54) METHOD OF MANUFACTURING CERIUM DIOXIDE POWDER AND CERIUM DIOXIDE POWDER

(71) Applicants: TAIWAN SEMICONDUCTOR MANUFACTURING CO., LTD., Hsinchu (TW); NATIONAL TAIWAN UNIVERSITY, Taipei (TW)

(72) Inventors: Chung-Hsin Lu, Taipei (TW); Yong-Jian Liu, Taipei (TW); Shu-Hao Huang, Taichung (TW); Chi-Ming Yang, Hsinchu (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 1197 days.

(21) Appl. No.: 14/852,428

(22) Filed: Sep. 11, 2015

(65) Prior Publication Data
US 2016/0075564 A1    Mar. 17, 2016

(30) Foreign Application Priority Data

Sep. 12, 2014 (TW) ................ 103131595

(51) Int. Cl.
*C01F 17/00* (2020.01)
*C09K 3/14* (2006.01)
*C01F 17/235* (2020.01)

(52) U.S. Cl.
CPC .......... *C09K 3/1409* (2013.01); *C01F 17/235* (2020.01); *C01P 2002/72* (2013.01);
(Continued)

(58) Field of Classification Search
None
See application file for complete search history.

(56) References Cited

U.S. PATENT DOCUMENTS 4,220,597 A * 9/1980 Halcourt ................ C07C 46/02
552/268
4,558,119 A * 12/1985 Yamashita ............ C08G 65/44
528/212
(Continued)

FOREIGN PATENT DOCUMENTS

CN    1760132 A    4/2006
CN    102942204 A  2/2013
(Continued)

OTHER PUBLICATIONS

Verdon, E., Devalette, M., Demazcau, G. "Solvothermal synthesis of cerium dioxide microcrystallites: effect of the solvent" Materials Letters 25 (1995): pp. 127-131. (Year: 1995).*

*Primary Examiner* — Scott R. Walshon
*Assistant Examiner* — Thomas A Mangohig
(74) *Attorney, Agent, or Firm* — Cooper Legal Group, LLC

(57) ABSTRACT

A method of manufacturing a cerium dioxide powder is provided. The method includes mixing a cerium salt, an amine and solvent to form a mixed solution, in which the amine includes a secondary amine, a tertiary amine or a combination thereof, and the tertiary amine is selected from the group consisting of hexamethylenetetramine, triethylenediamine and a combination thereof. A solvothermal reaction of the mixed solution is performed to form the cerium dioxide powder. The cerium dioxide powder manufactured by the method is also provided herein.

20 Claims, 4 Drawing Sheets

(52) U.S. Cl.
CPC ...... *C01P 2004/01* (2013.01); *C01P 2004/04* (2013.01); *C01P 2004/64* (2013.01); *C01P 2006/60* (2013.01)

(56) References Cited

U.S. PATENT DOCUMENTS

| | | | | |
|---|---|---|---|---|
| 5,011,671 | A | * | 4/1991 | Le Loarer ................ B01J 23/10 423/263 |
| 5,389,352 | A | * | 2/1995 | Wang .................... B82Y 30/00 106/3 |
| 2004/0167080 | A1 | * | 8/2004 | Dodge ................... C07H 17/02 514/23 |
| 2005/0031517 | A1 | * | 2/2005 | Chan ........................ B01F 7/18 423/263 |
| 2009/0011930 | A1 | * | 1/2009 | Hagemeyer ............ B01J 23/002 502/182 |
| 2012/0316266 | A1 | * | 12/2012 | Koyama ............. B01J 13/0047 523/458 |

FOREIGN PATENT DOCUMENTS

| | | | |
|---|---|---|---|
| CN | 103896321 | A | 7/2014 |
| TW | 200510251 | A | 3/2005 |
| TW | 200706494 | A | 2/2007 |
| TW | 201406891 | A | 2/2014 |

\* cited by examiner

METHOD OF MANUFACTURING CERIUM DIOXIDE POWDER AND CERIUM DIOXIDE POWDER

RELATED APPLICATIONS

This application claims priority to Taiwan Application Serial Number 103131595, filed Sep. 12, 2014, which is herein incorporated by reference.

BACKGROUND

In a very large scale integration (VLSI) process technique, removing unevenness of a surface of a wafer is necessary since wafer size and an amount of metal layers are increased, and transistors and metal wires continuously toward miniaturization.

Chemical mechanical polishing is a planarization technique often used in semiconductor processes, which is to place the wafer between a carrier/head and a rotating table with a polishing pad on a surface of the rotating table. Next, a polishing agent is sprayed over the surface of the wafer, and convex portions of a deposited layer over the wafer is polished to form a planar surface through interaction of chemical etching and mechanical polishing. Currently, such technique is widely used in planarization processes of metal layers and low-k dielectric layers.

Cerium dioxide exhibits excellent abrasive property, and thus is widely applied in modern industry field. For example, in semiconductor processes, a relatively removal rate of cerium dioxide to silicon dioxide is quite great, and thus is suitable in the planarization process of insulating layers. In an optoelectionic field, such as liquid crystal display (LCD), cerium dioxide possesses excellent abrasive effect to mother glass and thus is widely applied. However, the component and the physical property of the polishing slurry, such as particle size and dispersity, should be precisely controlled to effectively control polishing rate to obtain an ideal planar surface.

Currently, a variety of processes can be used to synthesize cerium dioxide. However, the cerium dioxide polishing powder should have an average particle size in a range of 1 nm to 200 nm and good dispersity. The powder with larger particle size can increase polishing rate, and the powder with good dispersity can avoid powder agglomeration and thus to extend available time of polishng liquid. However, the cerium dioxide powder formed using current processes cannot have all of the properties mentioned above. Therefore, there is a need of a novel method of manufacturing the cerium dioxide powder to have all of the properties mentioned above.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
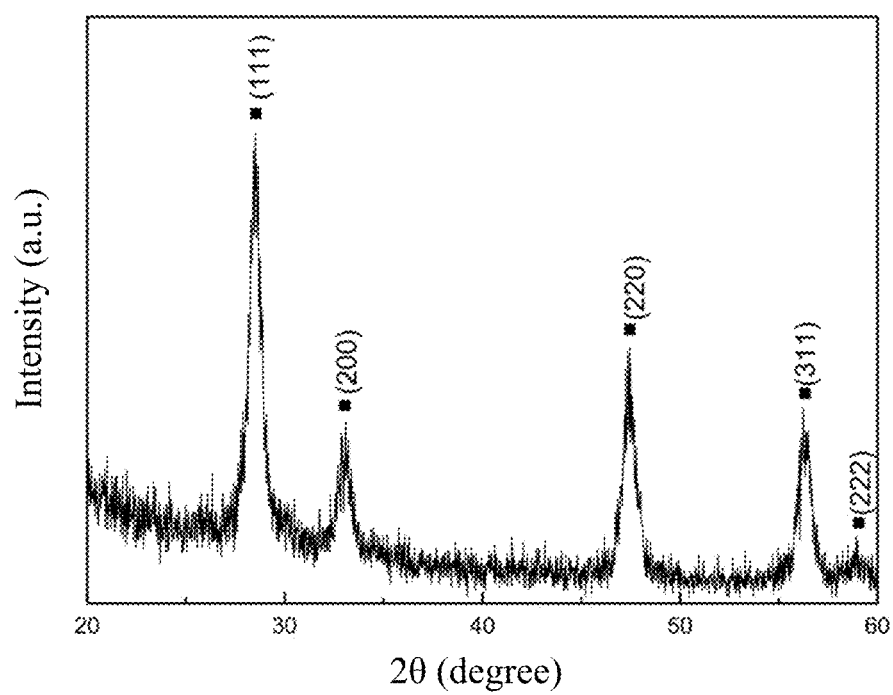
FIG. 1 is a X-ray diffraction pattern of the compound of Example 1.

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure.

Chemical mechanical polishing technique is a planarization process relied by each semiconductor plant. In the chemical mechanical polishing technique, mechanical polishing is coordinated with chemical polishing solution to oxidize protruding portions of a deposited layer over a surface of a wafer to form a soften oxide layer and then to be planarized, and thus to form a planar surface to a subsequent circuit layer. Since a cerium dioxide powder exhibits excellent abrasive property, it can be used in the planarization process of semiconductor processes. However, the cerium dioxide should have an average particle size in a range of 1 nm to 200 nm and good dispersity to effectively control polishing rate. Therefore, an aspect of the present disclosure provides a method of manufacturing a cerium dioxide powder to form the cerium dioxide powder with an average particle size in a range of 1 nm to 200 nm and good dispersity. An average particle size of the cerium dioxide powder is in a range of 2 nm to 150 nm. An average particle size of the cerium dioxide powder is in a range of 3 nm to 100 nm.

The manufacturing method includes mixing a cerium salt, an amine and solvent to form a mixed solution. The cerium salt may be any cerium salt able to be dissolved in a solvent. The cerium salt may be cerium nitrate, cerium chloride, cerium sulfate, cerium carboxylate (e.g., cerium acetate), hydrate of above-mentioned cerium salt or a combination thereof. In some embodiments, the cerium salt includes cerium carboxylate. In some embodiments, the cerium carboxylate includes cerium acetate. The solvent includes water, alcohols, esters, ethers or a combination thereof. Other solvent, which can fully or partially dissolve the cerium salt, can also be used. A pH value of the solvent can be adjusted using acid or base. For example, the cerium salt can be firstly dissolved in water or alcohols to form a cerium ion solution, and the amine is then added into the cerium ion solution. Subsequently, a solvothermal reaction of the mixed solution is performed to form the cerium dioxide powder. The solvothermal method is used to let small nuclei grow and thus to form particles with larger particle size. Generally, small particles are easily synthesized, but larger particles with high crystallinity are difficultly synthesized. Therefore, the amine is used as a basic substance in the mixing step mentioned above in the present diclosure. When the amine is added into the cerium ion solution, a weak base environment is gradually formed, and space steric hindrance is changed due to the presence of the amine, and thus to form the cerium dioxide with larger particle size in the solvothermal reaction.

In some embodiments, the amine includes a secondary amine, a tertiary amine or a combination thereof. In some embodiments, the secondary amine is diethylamine, N-ethylpropylamine, dipropylamine, N-methylethylamine, N-propylbutylamine, imidazole or a combination thereof. In some embodiments, a molar ratio of the cerium salt to the secondary amine is in a range of 10:1 to 1:20. If the molar ratio of the cerium salt to the secondary amine is greater than 10:1, yield will be declined. If the molar ratio of the cerium salt to the secondary amine is lower than 1:20, the basic source will be wasted and cost of waste liquid treatment will be increased.

In some embodiments, the tertiary amine includes bicyclic tertiary amine, polycyclic tertiary amine (e.g., tricyclic tertiary amine) or a combination thereof. In some embodiments, the tertiary amine includes bicyclic tertiary alkyl amine, polycyclic tertiary alkyl amine (e.g., tricyclic tertiary alkyl amine) or a combination thereof. In some embodiments, the tertiary amine is selected from the group consisting of hexamethylenetetramine, triethylenediamine and a combination thereof. In some embodiments, a molar ratio of the cerium salt to the tertiary amine is less than 1. In some embodiments, a molar ratio of the cerium salt to the tertiary amine is in a range of 1:2 to 1:8. In some embodiments, a molar ratio of the cerium salt to the tertiary amine is in a range of 1:3 to 1:7. In some embodiments, a molar ratio of the cerium salt to the tertiary amine is in a range of 1:4 to 1:6. In some embodiments, a concentration of the tertiary amine is in a range of 0.03 mol/L to 0.20 mol/L. In some embodiments, a concentration of the tertiary amine is in a range of 0.05 mol/L to 0.15 mol/L. In some embodiments, a concentration of the tertiary amine is in a range of 0.07 mol/L to 0.13 mol/L. In some embodiments, a concentration of the cerium salt is in a range of 0.01 mol/L to 0.03 mol/L.

Temperature, pressure and reaction time of the solvothermal reaction are also related to synthesis of the cerium dioxide. In some embodiments, performing the solvothermal reaction of the mixed solution is at a temperature in a range of 50° C. to 300° C. In some embodiments, performing the solvothermal reaction of the mixed solution is at a pressure in a range of 0.1 atm to 100 atm. In the aforementioned ranges of temperature and pressure, nucleation and reaction of the cerium dioxide will occur. In some embodiments, the reaction may be in a range of 15 minutes to 12 hours. The solvothermal reaction may be performed in a closed or open system.

The present disclosure also provides a cerium dioxide powder for polishing, which is manufactured by the method mentioned above. In one specific embodiment, the cerium dioxide powder has an average particle size in a range of 1 nm to 200 nm. In some embodiments, the cerium dioxide powder has an average particle size in a range of 3 nm to 12 nm. In some embodiments, the cerium dioxide powder has an average particle size in a range of 5 nm to 10 nm. Such cerium dioxide powder is very suitable as the polishing powder in the chemical mechanical polishing process in semiconductor field since it possesses larger particle size and good dispersity.

EXAMPLES

The following Examples are provided to illustrate certain aspects of the present disclosure and to aid those of skill in the art in practicing this disclosure. These Examples are in no way to be considered to limit the scope of the disclosure in any manner.

Example 1

Figure 2:
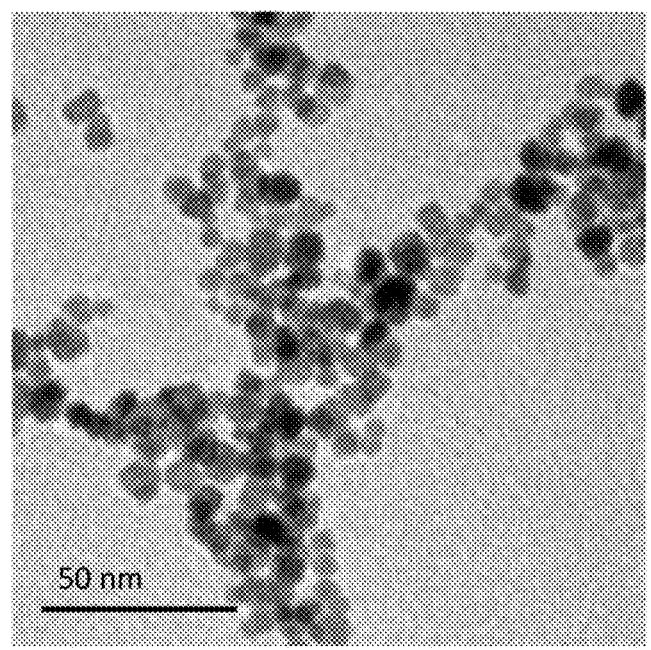
FIG. 2 is a transmission electron microscopy (TEM) image of the compound of Example 1.

A cerium salt was dissolved in deionized water to form ion solution. Next, diethylamine (secondary amine) was added into the ion solution and stirred at ambient temperature. A molar ratio of the cerium salt to diethylamine was 5:2. After homogeneous mixing, the solution was placed and sealed in a solvothermal bottle made of Teflon, and solvothermal reaction was then performed at 110° C. and 2.7 atm with 25 minutes. After completion of the reaction, a compound sample was obtained. For X-ray diffraction pattern analysis, as shown in FIG. 1, the compound had five main diffraction peaks of (111), (220), (311), (200) and (222), which is consistent with ICDD No. 43-1002 and thus recognized as cerium dioxide with cubic fluorite structure. According to Scherrer Equation and measured half-height width of the (111) peak, the grain size was 10.2 nm. In addition, as shown in FIG. 2, the particle size of the cerium dioxide powder was in a range of about 8 nm to about 12 nm using a transmission electron microscope.

Comparative Example 1

Figure 3:
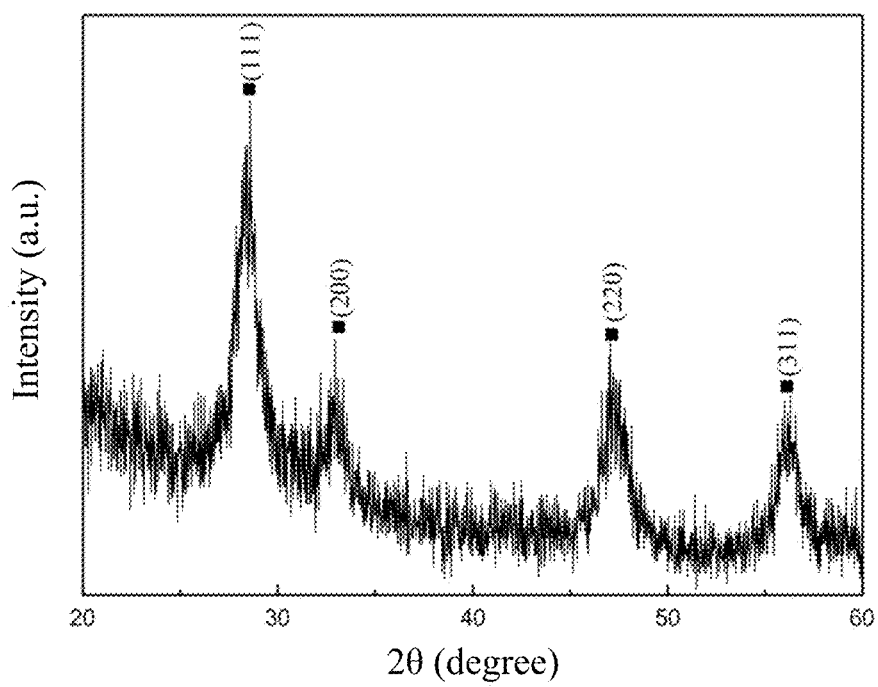
FIG. 3 is a X-ray diffraction pattern of the compound of Comparative Example 1.
Figure 4:
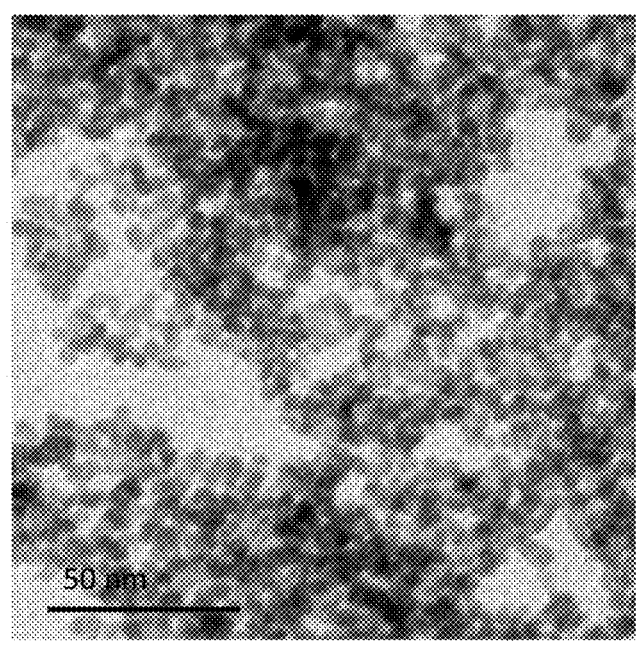
FIG. 4 is a TEM image of the compound of Comparative Example 1.

A cerium salt was dissolved in deionized water to form ion solution. Next, butylamine (primary amine), which has the same molecular weight as diethylamine, was added into the ion solution and stirred at ambient temperature. A molar ratio of the cerium salt to butylamine was 5:2. After homogeneous mixing, the solution was placed and sealed in a solvothermal bottle made of Teflon, and solvothermal reaction was then performed at 110° C. and 2.7 atm with 25 minutes. After completion of the reaction, a compound sample was obtained. For X-ray diffraction pattern analysis, as shown in FIG. 3, the compound was recognized as cerium dioxide with cubic fluorite structure. According to Scherrer Equation and measured half-height width of the (111) peak, the grain size was 5.6 nm. As shown in FIG. 4, the particle size of the cerium dioxide powder was in a range of about 4 nm to about 7 nm using a transmission electron microscope. Compared to Example 1 using organic amine with the same molecular weight as the basic source, the synthesized cerium dioxide using secondary amine has larger particle size than that using primary amine.

Example 2

A cerium salt was dissolved in deionized water to form ion solution. Next, N-ethylpropylamine (secondary amine) was added into the ion solution and stirred at ambient temperature. A molar ratio of the cerium salt to N-ethylpropylamine was 5:2. After homogeneous mixing, the solution was placed and sealed in a solvothermal bottle made of Teflon, and solvothermal reaction was then performed at 105° C. and 2.5 atm with 20 minutes. After completion of the reaction, a compound sample was obtained. The compound was recognized as cerium dioxide with cubic fluorite structure using X-ray diffraction pattern analysis. According to Scherrer Equation and measured half-height width of the (111) peak, the grain size was 12.8 nm. The particle size of the cerium dioxide powder was in a range of about 10 nm to about 13 nm using a transmission electron microscope.

Comparative Example 2

A cerium salt was dissolved in deionized water to form ion solution. Next, pentylamine (primary amine), which has the same molecular weight as N-ethylpropylamine, was added into the ion solution and stirred at ambient temperature. A molar ratio of the cerium salt to pentylamine was 5:2. After homogeneous mixing, the solution was placed and sealed in a solvothermal bottle made of Teflon, and solvothermal reaction was then performed at 105° C. and 2.5 atm with 20 minutes. After completion of the reaction, a compound sample was obtained. The compound was recognized as cerium dioxide with cubic fluorite structure using X-ray diffraction pattern analysis. According to Scherrer Equation and measured half-height width of the (111) peak, the grain size was 7.5 nm. The particle size of the cerium dioxide powder was in a range of about 4 nm to about 8 nm using a transmission electron microscope. Compared to Example 2 using organic amine with the same molecular weight as the basic source, the synthesized cerium dioxide using secondary amine has larger particle size than that using primary amine.

Example 3

A cerium salt was dissolved in deionized water to form ion solution. Next, dipropylamine (secondary amine) was added into the ion solution and stirred at ambient temperature. A molar ratio of the cerium salt to dipropylamine was 5:2. After homogeneous mixing, the solution was placed and sealed in a solvothermal bottle made of Teflon, and solvothermal reaction was then performed at 110° C. and 2.7 atm with 25 minutes. After completion of the reaction, a compound sample was obtained. The compound was recognized as cerium dioxide with cubic fluorite structure using X-ray diffraction pattern analysis. According to Scherrer Equation and measured half-height width of the (111) peak, the grain size was 7.2 nm. The particle size of the cerium dioxide powder was in a range of about 6 nm to about 10 nm using a transmission electron microscope.

Comparative Example 3

A cerium salt was dissolved in deionized water to form ion solution. Next, hexylamine (primary amine), which has the same molecular weight as dipropylamine, was added into the ion solution and stirred at ambient temperature. A molar ratio of the cerium salt to hexylamine was 5:2. After homogeneous mixing, the solution was placed and sealed in a solvothermal bottle made of Teflon, and solvothermal reaction was then performed at 110° C. and 2.7 atm with 25 minutes. After completion of the reaction, a compound sample was obtained. The compound was recognized as cerium dioxide with cubic fluorite structure using X-ray diffraction pattern analysis. According to Scherrer Equation and measured half-height width of the (111) peak, the grain size was 4.8 nm. The particle size of the cerium dioxide powder was in a range of about 2 nm to about 5 nm using a transmission electron microscope. Compared to Example 3 using organic amine with the same molecular weight as the basic source, the synthesized cerium dioxide using secondary amine has larger particle size than that using primary amine.

Example 4

Cerium nitrate was dissolved in deionized water to form ion solution with a concentration of 0.02 mol/L. Next, hexamethylenetetramine (tertiary amine) was added into the ion solution with a concentration of 0.10 mole/L (based on the deionized water) and stirred at ambient temperature. A molar ratio of the cerium nitrate to hexamethylenetetramine was 1:5. After homogeneous mixing, the solution was placed and sealed in a solvothermal bottle made of Teflon, and solvothermal reaction was then performed at 180° C. with 60 minutes. After completion of the reaction, a compound sample was obtained. The compound was recognized as cerium dioxide with cubic fluorite structure using X-ray diffraction pattern analysis. The cerium dioxide powder was hexagonal-shaped and had a particle size in a range of about 30 nm to about 60 nm using a transmission electron microscope.

Example 5

Cerium acetate was dissolved in deionized water to form ion solution with a concentration of 0.02 mol/L. Next, hexamethylenetetramine (tertiary amine) was added into the ion solution with a concentration of 0.10 mole/L (based on the deionized water) and stirred at ambient temperature. A molar ratio of the cerium acetate to hexamethylenetetramine was 1:5. After homogeneous mixing, the solution was placed and sealed in a solvothermal bottle made of Teflon, and solvothermal reaction was then performed at 120° C. with 60 minutes. After completion of the reaction, a compound sample was obtained. The compound was recognized as cerium dioxide with cubic fluorite structure using X-ray diffraction pattern analysis. The cerium dioxide powder was spherical and had a particle size in a range of about 5 nm to about 10 nm using a transmission electron microscope.

Figure 5:
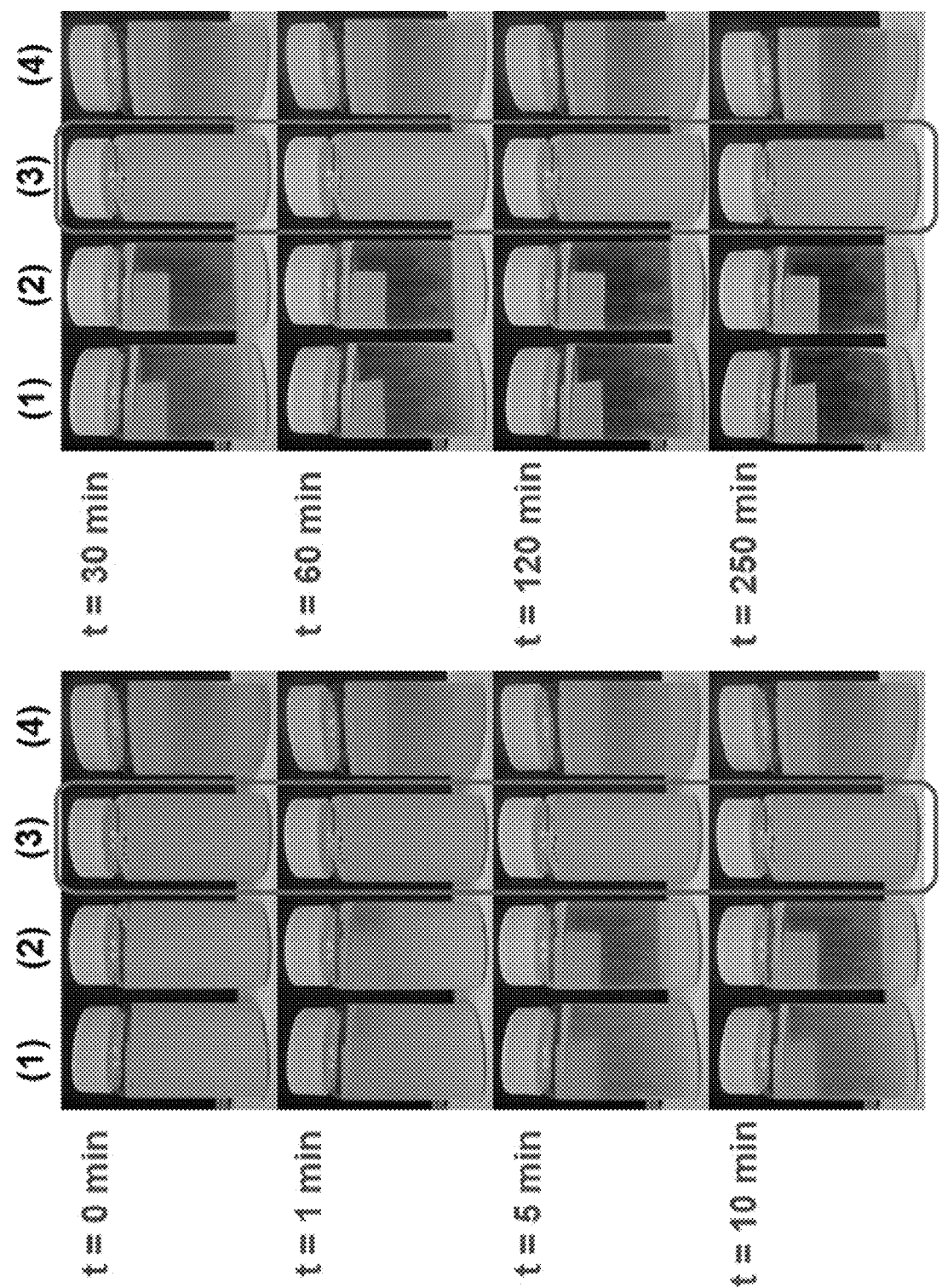
FIG. 5 are photos of the compound samples synthesized from different cerium salts ((1) cerium nitrate (i.e., Example 4); (2) cerium ammonium nitrate; (3) cerium acetate (i.e., Example 5); (4) cerium sulfate) at different times (T=0 min (after shaking), 1 min, 5 mins, 10 mins, 30 mins, 60 mins, 120 mins and 250 mins).

The obtained compound samples including cerium dioxide and deionized water of Examples 4-5 were placed to observe sedimentation. FIG. 5 are photos of the compound samples synthesized from different cerium salts ((1) cerium nitrate (i.e., Example 4); (2) cerium ammonium nitrate; (3) cerium acetate (i.e., Example 5); (4) cerium sulfate) at different times (T=0 min (after shaking), 1 min, 5 mins, 10 mins, 30 mins, 60 mins, 120 mins and 250 mins). As shown in FIG. 5, the compound sample of (3) was always turbid compared to those of (1), (2) and (4). In other words, the compound sample of (3) was self-stabilized, and thus there was no sedimentation occurred.

Figure 6:
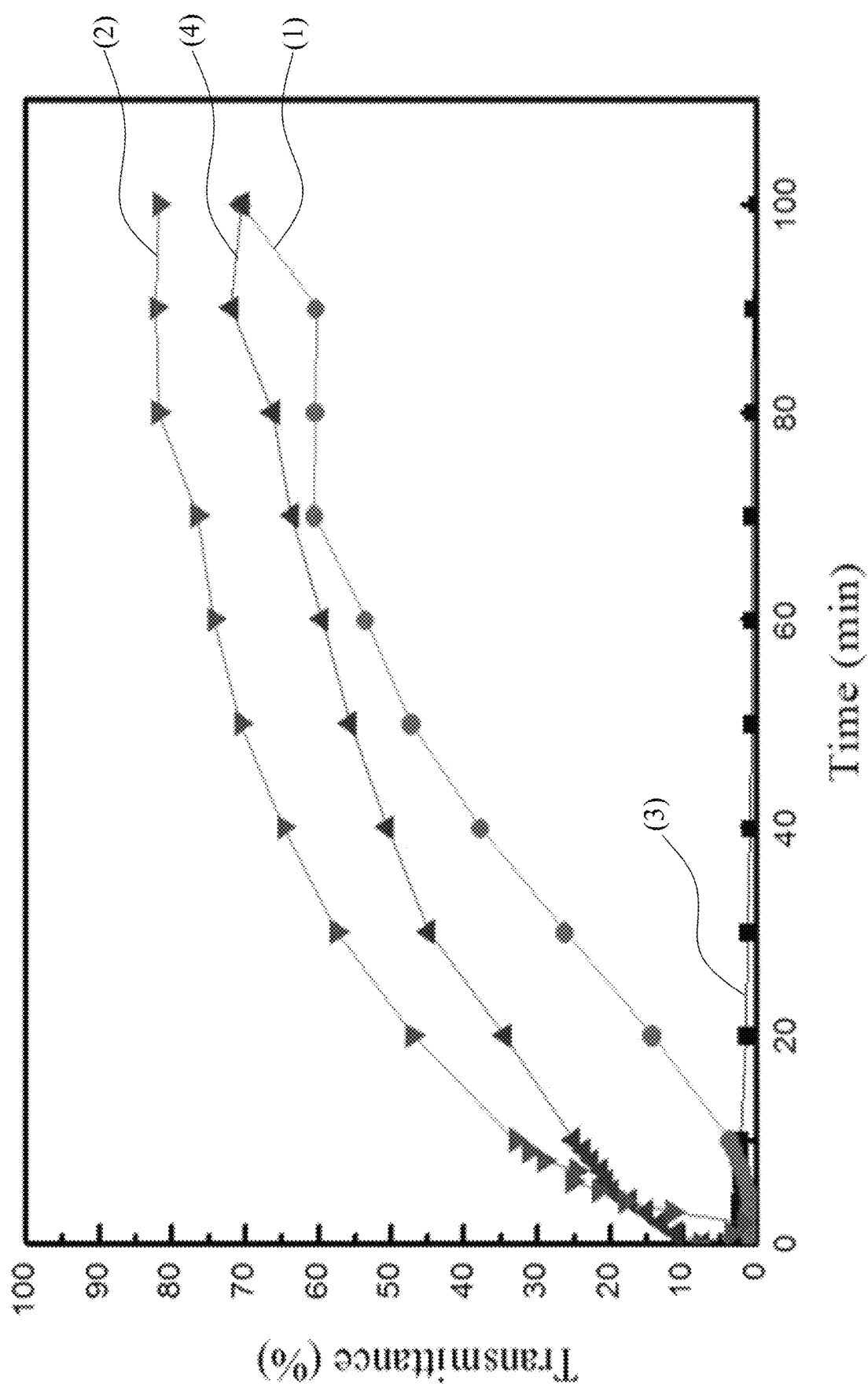
FIG. 6 is a light transmittance diagram of the compound samples synthesized from different cerium salts ((1) cerium nitrate (i.e., Example 4); (2) cerium ammonium nitrate; (3) cerium acetate (i.e., Example 5); (4) cerium sulfate) at different times measured by a UV-VIS spectrometer.

FIG. 6 is a light transmittance diagram of the compound samples synthesized from different cerium salts ((1) cerium nitrate (i.e., Example 4); (2) cerium ammonium nitrate; (3) cerium acetate (i.e., Example 5); (4) cerium sulfate) at different times measured by a UV-VIS spectrometer. As shown in FIG. 6, compared to those of (1), (2) and (4), the compound sample of (3) had very low light transmittance continuously, and the light transmittance was decreased with time, which means that the compound sample of (3) was self-stabilized.

Given the above, the present disclosure indeed provides the cerium dioxide powder with larger particle size and good dispersity, and thus the cerium dioxide powder can be acted as the polishing powder in the chemical mechanical polishing process in semiconductor field.

According to some embodiments, a method of manufacturing a cerium dioxide powder includes mixing a cerium salt, an amine and solvent to form a mixed solution, in which the amine includes a secondary amine, a tertiary amine or a combination thereof, and the tertiary amine is selected from the group consisting of hexamethylenetetramine, triethylenediamine and a combination thereof; and performing a solvothermal reaction of the mixed solution to form the cerium dioxide powder.

According to some embodiments, a method of manufacturing a cerium dioxide powder includes mixing a cerium salt, an amine and solvent to form a mixed solution, in which the cerium salt includes cerium carboxylate, and the amine includes a secondary amine, a tertiary amine or a combination thereof; and performing a solvothermal reaction of the mixed solution to form the cerium dioxide powder.

According to some embodiments, a cerium dioxide powder manufactured by the method mentioned above.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a cerium dioxide powder, the method comprising:
    providing a mixed solution consisting of a cerium salt, a tertiary amine and solvent, wherein:
        the tertiary amine is selected from the group consisting of bicyclic tertiary alkyl amine, tricyclic tertiary alkyl amine and a combination thereof, and
        the cerium salt comprises only cerium carboxylate; and
    performing a solvothermal reaction of the mixed solution at a temperature in a range of 50° C. to 300° C. to form the cerium dioxide powder.

2. The method of claim 1, wherein performing the solvothermal reaction of the mixed solution is at a pressure in a range of 0.1 atm to 100 atm.

3. The method of claim 1, wherein the solvent comprises alcohols, esters, ethers or a combination thereof.

4. The method of claim 1, wherein the solvent comprises alcohols.

5. The method of claim 1, wherein the solvent comprises esters.

6. The method of claim 1, wherein the solvent comprises ethers.

7. The method of claim 1, wherein the cerium carboxylate comprises cerium acetate.

8. The method of claim 1, wherein a molar ratio of the cerium salt to the tertiary amine is in a range of 1:2 to 1:8.

9. The method of claim 1, wherein a molar ratio of the cerium salt to the tertiary amine is less than 1.

10. The method of claim 1, wherein:
    a concentration of the cerium salt is in a range of 0.01 mol/L to 0.03 mol/L, and
    a concentration of the tertiary amine is in a range of 0.03 mol/L to 0.20 mol/L.

11. The method of claim 1, wherein performing the solvothermal reaction of the mixed solution comprises performing the solvothermal reaction to form the cerium dioxide powder comprising cerium dioxide with a cubic fluorite structure.

12. A method of manufacturing a cerium dioxide powder, the method comprising:
    providing a mixed solution consisting of a cerium salt, a tertiary amine and solvent, wherein:
        the tertiary amine is selected from the group consisting of bicyclic tertiary alkyl amine, tricyclic tertiary alkyl amine and a combination thereof, and
        the cerium salt comprises only cerium carboxylate; and
    performing a solvothermal reaction of the mixed solution at a temperature in a range of 50° C. to 300° C. to form the cerium dioxide powder, wherein the cerium dioxide powder has an average particle size in a range of 1 nm to 200 nm.

13. The method of claim 12, wherein the cerium dioxide powder has an average particle size in a range of 3 nm to 12 nm.

14. The method of claim 12, wherein the cerium dioxide powder has an average particle size in a range of 5 nm to 10 nm.

15. The method of claim 12, wherein performing the solvothermal reaction of the mixed solution is at a pressure in a range of 0.1 atm to 100 atm.

16. The method of claim 12, wherein the solvent comprises alcohols, esters, ethers or a combination thereof.

17. The method of claim 12, wherein a concentration of the tertiary amine is in a range of 0.03 mol/L to 0.20 mol/L.

18. The method of claim 12, wherein a molar ratio of the cerium salt to the tertiary amine is in a range of 1:2 to 1:8.

19. A method of manufacturing a cerium dioxide powder, the method comprising:
    providing a mixed solution consisting of a cerium salt, a tertiary amine and solvent, wherein:
        the tertiary amine is selected from the group consisting of bicyclic tertiary alkyl amine, tricyclic tertiary alkyl amine and a combination thereof,
        the cerium salt comprises only cerium carboxylate, and
        a concentration of the tertiary amine is in a range of 0.03 mol/L to 0.20 mol/L; and
    performing a solvothermal reaction of the mixed solution at a temperature in a range of 50° C. to 300° C. to form the cerium dioxide powder.

20. The method of claim 19, wherein a concentration of the tertiary amine is in a range of 0.05 mol/L to 0.15 mol/L.

* * * * *